United States Patent [19]
Ishihara et al.

[11] Patent Number: 5,513,067
[45] Date of Patent: Apr. 30, 1996

[54] APPARATUS HAVING A SLIDER BUTTON AND ROTATING BODY FOR EJECTING A FUNCTION-AID UNIT FROM AN INFORMATION PROCESSING SYSTEM

[75] Inventors: Yoshihisa Ishihara; Tetsuroh Sasakawa, both of Kanagawa; Takane Fujino, Atsugi, all of Japan

[73] Assignee: International Business Machines Corporation, Armonk, N.Y.

[21] Appl. No.: 234,697

[22] Filed: Apr. 28, 1994

[30] Foreign Application Priority Data

Apr. 27, 1993 [JP] Japan ................................... 5-100616

[51] Int. Cl.⁶ .............................. G06F 1/16; H05K 7/10; H01R 13/62
[52] U.S. Cl. ............................................ 361/684; 439/160
[58] Field of Search ......................... 364/708.1; 439/152, 439/153, 155, 157, 159, 160, 540.1, 541.5; 361/684, 686, 737, 754, 798

[56] References Cited

U.S. PATENT DOCUMENTS

| 5,115,376 | 5/1992 | Nakajima | 361/798 |
| 5,197,894 | 3/1993 | Koike | 439/159 |
| 5,234,351 | 8/1993 | Dixon | 439/160 |
| 5,440,448 | 8/1995 | Stewart et al. | 361/684 |

Primary Examiner—Michael W. Phillips
Attorney, Agent, or Firm—Martin J. McKinley; Andrew J. Dillon; Craig J. Yudell

[57] ABSTRACT

An apparatus for ejecting a function-aid unit according to the present invention is intended to eject a function-aid unit which can be connected or disconnected to or from a connector on the side of the apparatus, and provides an extracting member for moving the function-aid unit so that the function-aid unit is pulled out of the connector, and a slider button operational in conjunction with a rotating body for causing said function-aid unit to be extracted from the connector by moving the extracting member from the outside of the apparatus.

4 Claims, 5 Drawing Sheets

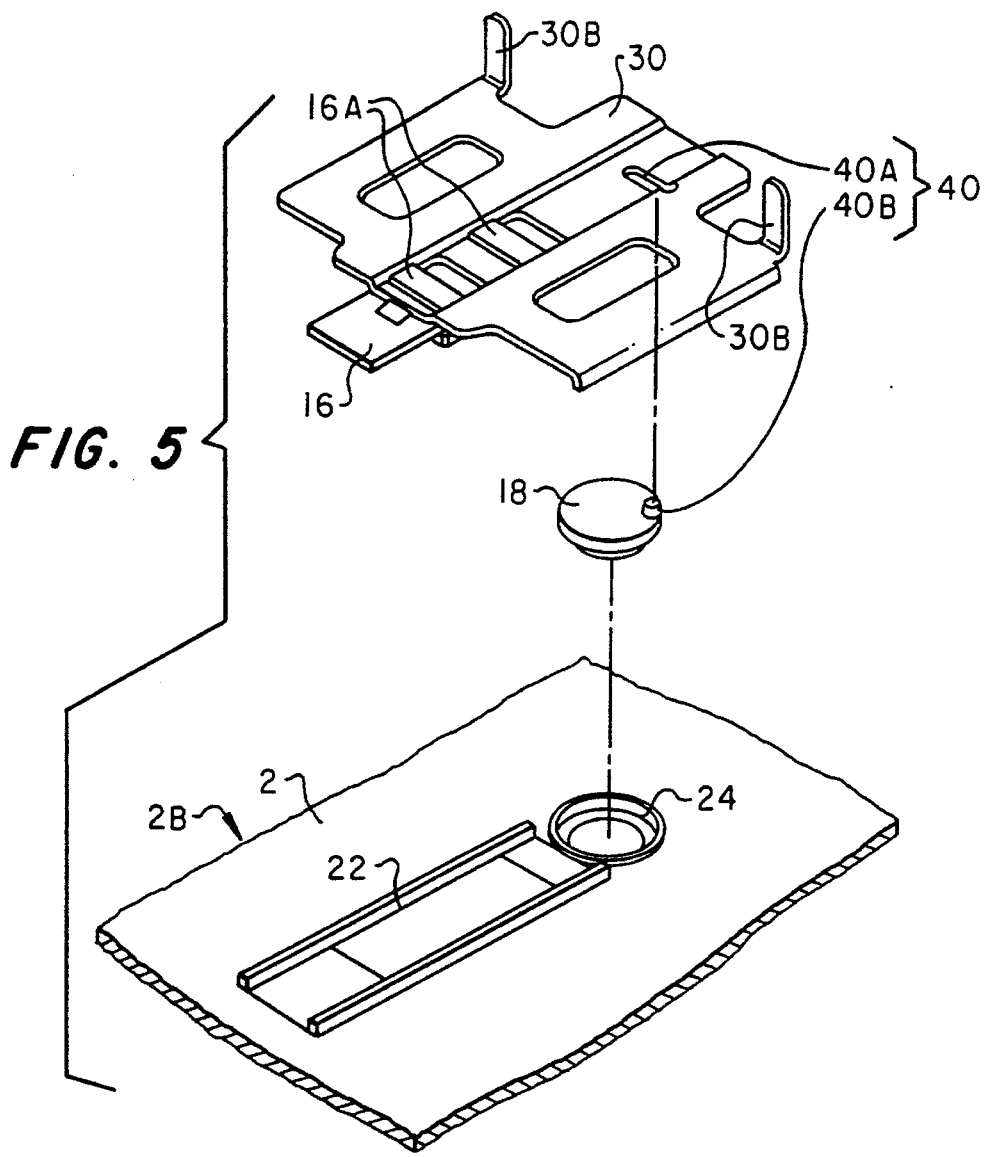
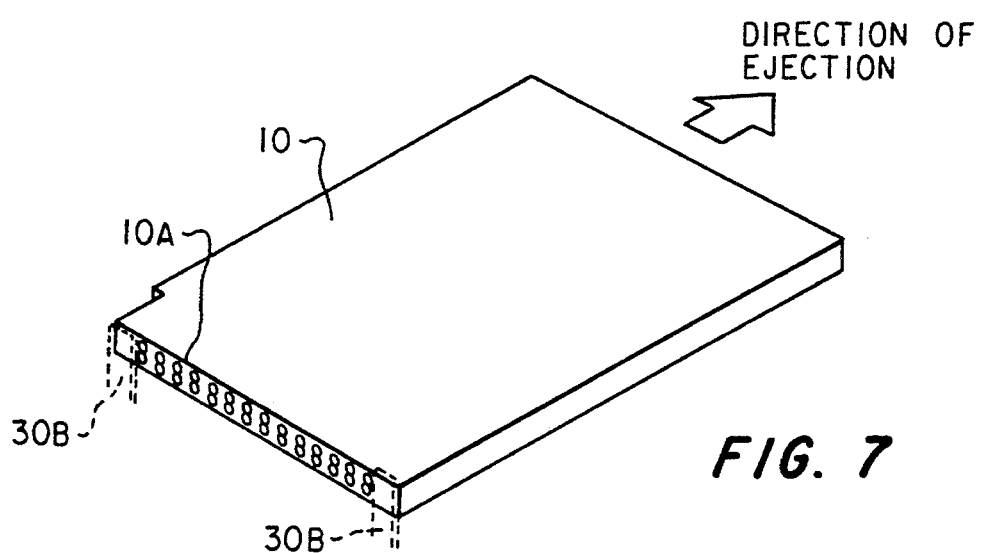

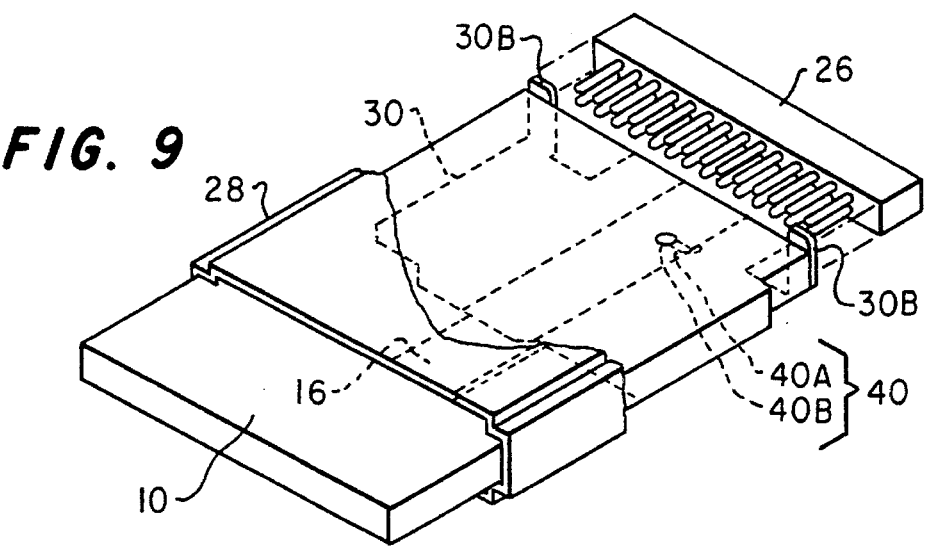
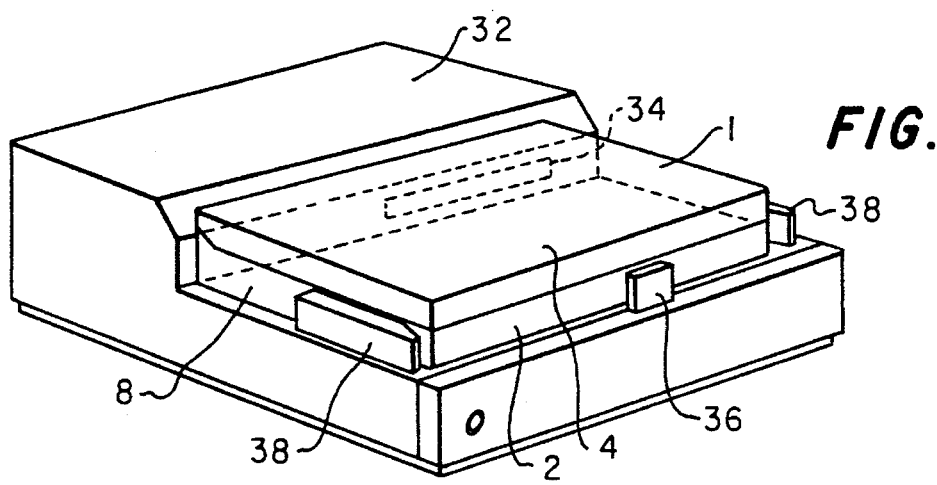
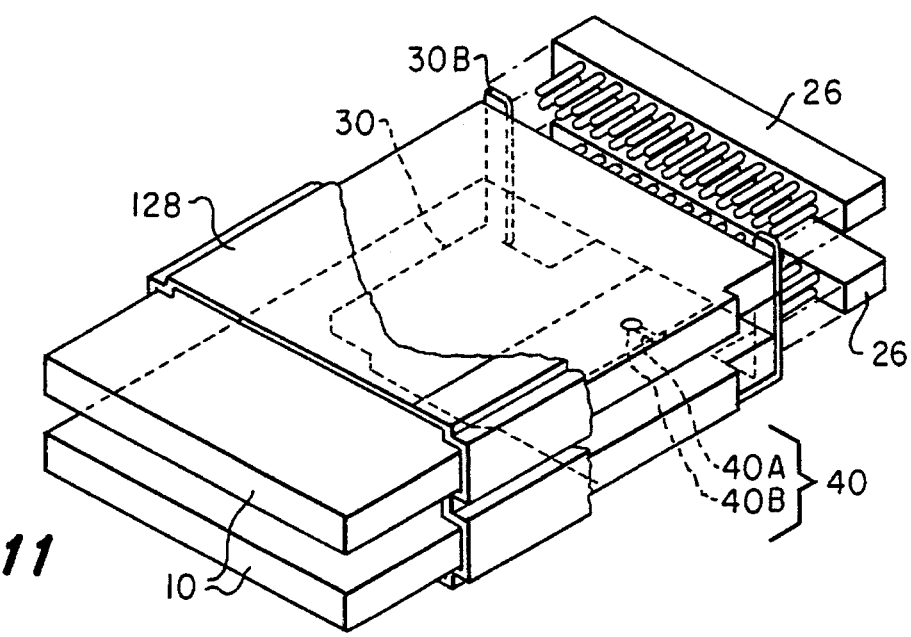

5,513,067

APPARATUS HAVING A SLIDER BUTTON AND ROTATING BODY FOR EJECTING A FUNCTION-AID UNIT FROM AN INFORMATION PROCESSING SYSTEM

BACKGROUND OF THE INVENTION

1. Technical Field

The present invention relates to an apparatus for ejecting function-aid units such as a card-type extended IC memory, a card-type hard disk apparatus, a modem card, a communication adapter card, etc. which can be attached or detached to or from an opposing apparatus such as an information processing system.

2. Description of the Related Art

Attachable or detachable card-type function-aid units are widely used in notebook personal computers. Standardization of such function-aid units to achieve uniformity is in the process of being established. In a conventional apparatus for ejecting a function-aid unit from a notebook, an eject button generally protrudes near a slot of the function-aid unit, and said function-aid unit is ejected from the slot through a mechanism using an internal lever etc. when the eject button is pressed. However, such an apparatus has the disadvantages of complexity in apparatus, increase in the number of parts, and difficulty in assemble and down-sizing.

SUMMARY OF THE INVENTION

An apparatus for ejecting a function-aid unit, according to the present invention, is provided which ejects a function-aid unit that can be connected or disconnected to or from a connector on the side of an opposing apparatus from said apparatus, and provides an extracting member for moving said function-aid unit so that said function-aid unit is pulled out of said connector, and a rotating body for causing said function-aid unit to be extracted from said connector by moving said extracting member when turned from the outside of said opposing apparatus.

Further, an information processing system according to the present invention provides a cabinet enclosing electronic circuits, an opening provided on said cabinet, an enclosure section for enclosing a function-aid unit inserted in said cabinet from said opening, a connector for electrically connecting to said function-aid unit within said enclosure section, an extracting member for pulling said function-aid unit out of said connector by moving said function-aid unit enclosed in said enclosure section, and a rotating body which is supported rotatably on said cabinet and causes said function-aid unit to be extracted from said connector by action on said extracting member when turned from the outside of said cabinet.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 perspective view showing a preferred mode in which the extracting member and the slider button of said embodiment are fitted in a cabinet;

FIG. 7 is a perspective view showing the function-aid unit of said embodiment;

FIG. 9 is a perspective view showing the state that the function-aid unit of said embodiment is pulled out of the connector on the side of the system within the enclosure section;

FIG. 10 is a perspective view showing the state that said embodiment is locked on an expansion unit; and FIG. 11 is a perspective view showing the state that two function-aid units are pulled out of connectors on the side of the system within the enclosure section.

DETAILED DESCRIPTION OF PREFERRED EMBODIMENT

Figure 1:
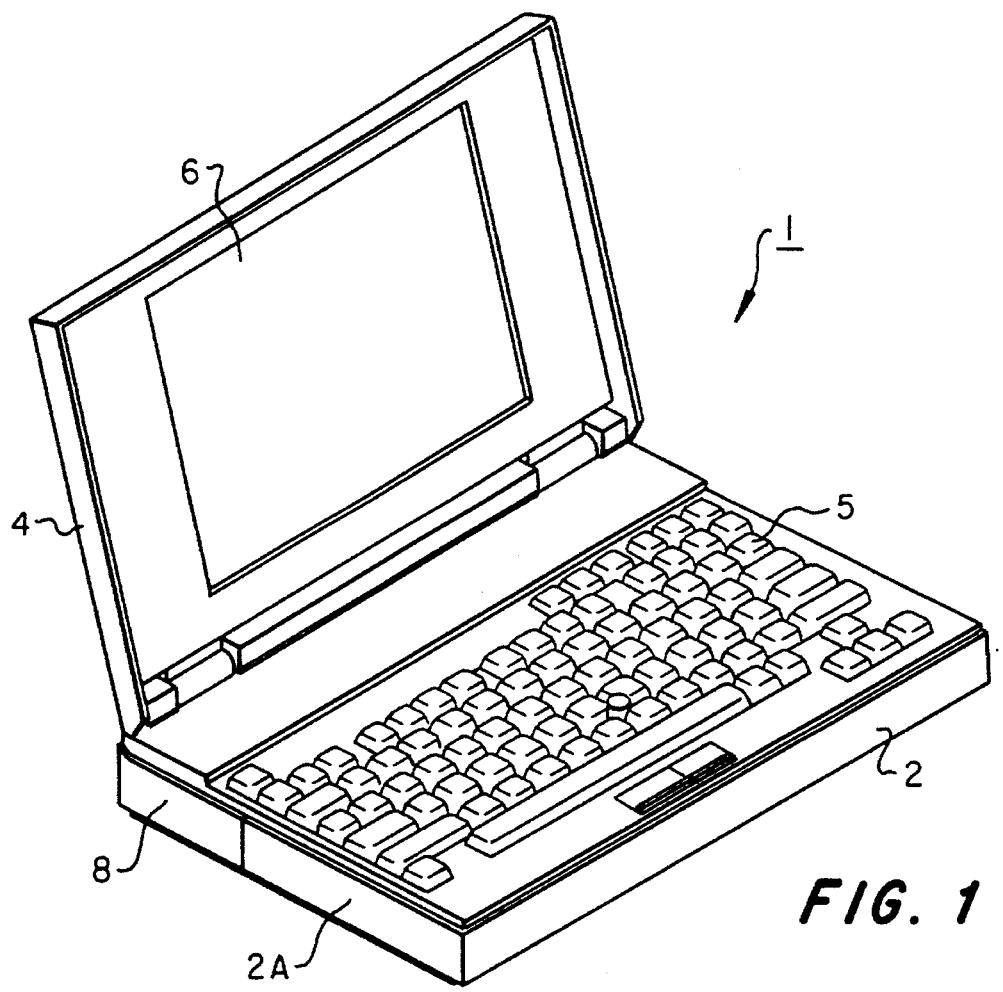
FIG. 1 is a perspective view showing the entire configuration of an embodiment of an information processing system in accordance with the present invention.

Referring to FIG. 1, an opposing apparatus, or an information processing system 1 includes a cabinet 2. Enclosed in the cabinet 2 are main electronic circuits (not shown) for information processing. Attached to the cabinet 2 is a cover 4 which can be opened or closed. When the cover 4 is opened, a keyboard 5 and a display 6 appear on the top surface and the inside of the cabinet 2, respectively. Removably attached to part of a side wall 2A of the cabinet 2 is a cover 8 for an opening.

Figure 2:
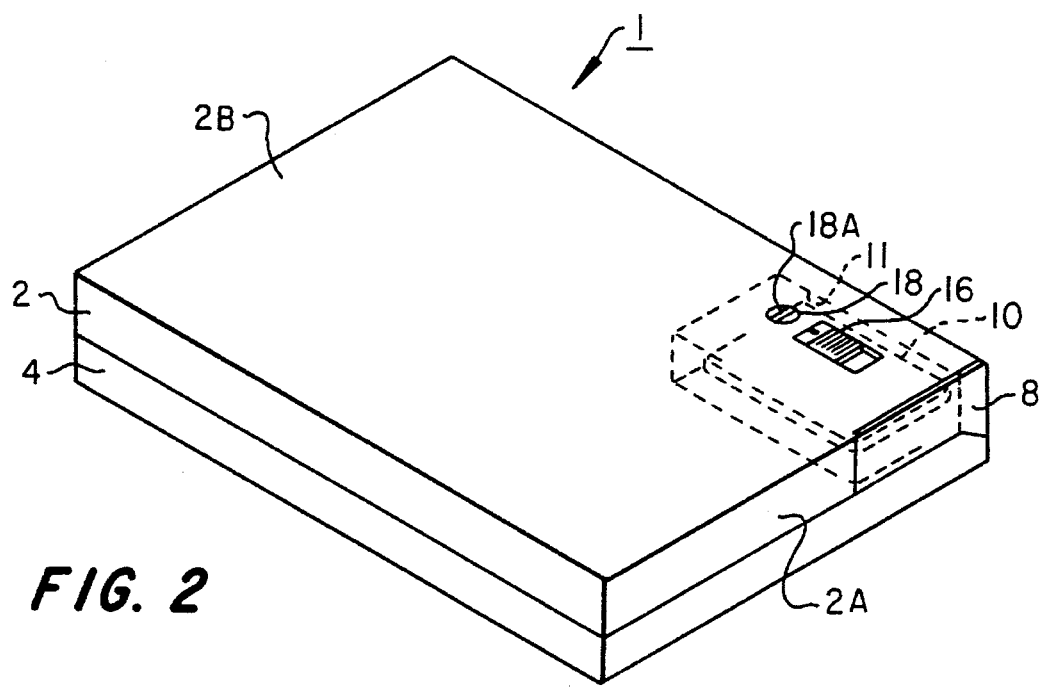
FIG. 2 is a perspective view showing a configuration of said embodiment on the bottom surface in a state that a function-aid unit is connected to a connector on the side of the system.
Figure 3:
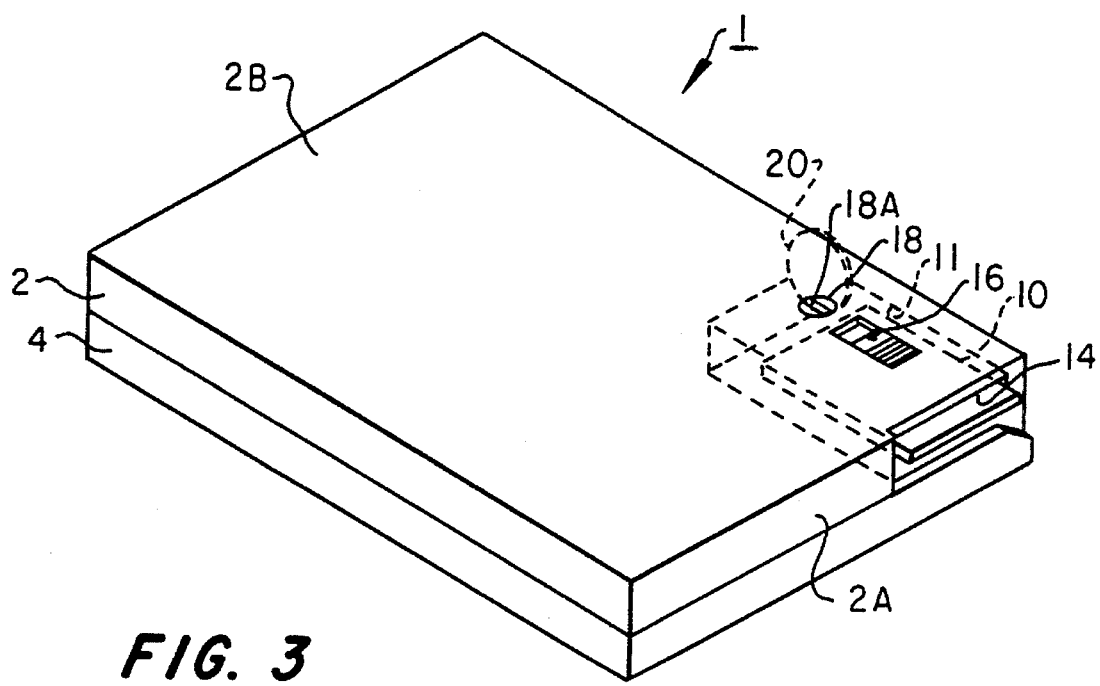
FIG. 3 is a perspective view showing a configuration of said embodiment on the bottom surface in a state that a function-aid unit is extracted from a connector on the side of the system.

FIG. 2 shows the system 1 placed face down with the cover 4 closed. Provided inside of the opening cover 8 is an enclosure section 11. The enclosure section can enclose a function-aid unit 10. FIG. 3 shows the state where the opening cover 8 is removed from the side wall 2A. When the opening cover 8 is removed from the side wall 2A, an opening 14 appears on the side wall 2A. The opening 14 extends to the enclosure section 11 and the function-aid unit 10 is enclosed into or taken out of the enclosure section 11 through the opening 14.

Referring to FIG. 2 and FIG. 3, provided on a bottom surface 2B of the cabinet 2 are a manipulation section, or a slider button 16 and a rotating body 18. The slider button 16 is supported on the cabinet 2 so that it can move in a direction of the insertion or ejection of the function-aid unit 10. The rotating body 18 is rotatably supported on the cabinet 2. Formed on the rotating body 18 is a notch 18A. As shown in FIG. 3, a coin 20 can be fit in the notch 18A and the rotating body 18 can be easily rotated by using the coin 20 instead of a screwdriver.

Figure 4:
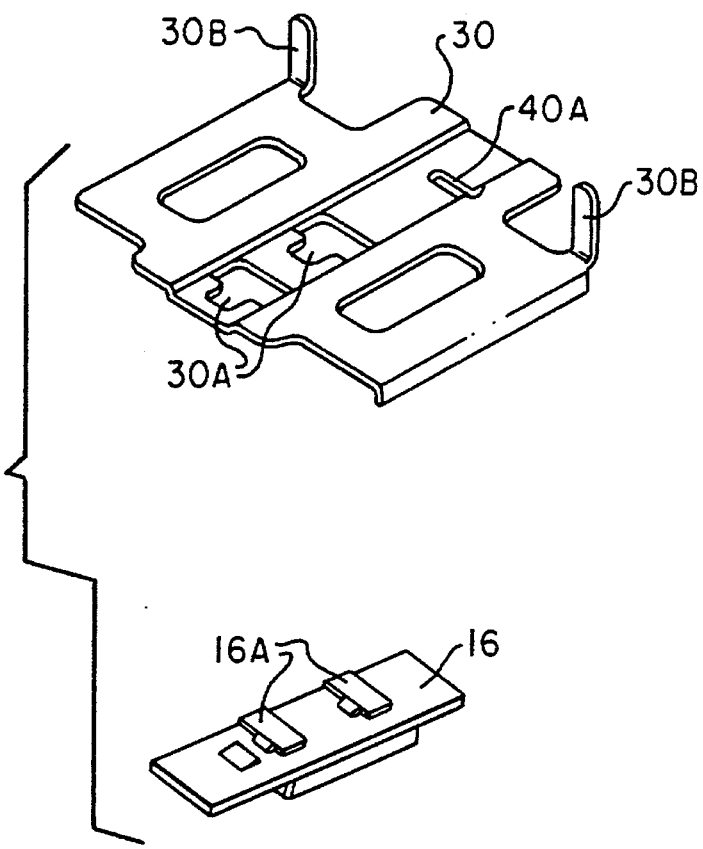
FIG. 4 is an exploded perspective view showing the configurations of an extracting member and a slider button of said embodiment.

FIG. 4 shows the manipulation section, or the slider button 16 and an extracting member 30. The slider button 16 is made of, for example, plastic material. Protrusions 16A extend from slider button 16. The extracting member 30 is made of, for example, a metallic plate and hollow openings 30A are formed in the middle of the member. When the protrusions 16A are fit into the hollow openings 30A by pressurizing, the slider button 16 is fixed to the extracting member 30. Further, formed on the extracting member 30 is a cam slot 40A, Still further, formed on the extracting member 30 are contact sections 30B. The contact sections 30B contact an end of the function-aid unit 10 and force it to move when the function-aid unit 10 is extracted from a connector 26 (refer to FIG. 8) by action on the function-aid unit 10 by the extracting member 30.

FIG. 5 shows part of an apparatus on the inside of the cabinet 2 into which the slider button 16 is fitted. Formed on the bottom surface 2B of the cabinet 2 is an opening 22 for the slider. The slider opening 22 guides and supports the slider button 16 so as to be able to be moved in the direction of the insertion or ejection of the function-aid unit 10 in a state that part of the slider button 16 is exposed to the outside of the bottom surface 2B. Further, formed close to the slider opening 22 on the bottom surface 2B is an opening 24 for a rotating body. The rotating body opening 24 supports the rotating body 18 so as to be able to be rotated in a state that part of the rotating body 18 is exposed to the outside of the bottom surface 2B.

Figure 6:
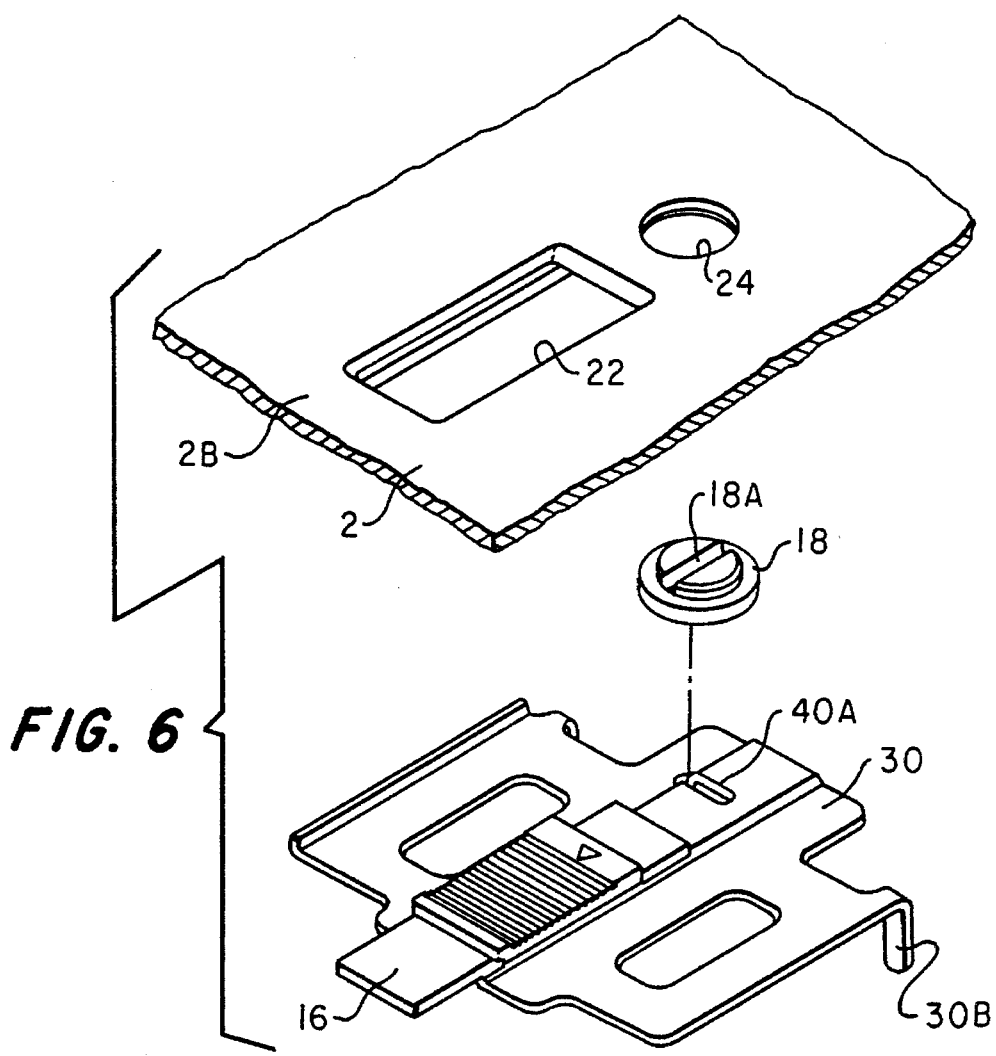
FIG. 6 is a perspective view showing a preferred mode in which the extracting member and the slider button of said embodiment are fitted in the cabinet in a different perspective from FIG. 5.

FIG. 6 shows the construction of FIG. 5 placed face down. As shown in FIG. 5 and FIG. 6, a cam body 40B is formed inside of the rotating body 18. The cam body 40B is inserted into the cam slot 40A in a state that the slider button 16 and the rotating body 18 are fitted in the slider opening 22 and the rotating body opening 24, respectively. The cam body 40B and the cam slot 40A compose a cam mechanism 40. When the rotating body 18 is turned on the outside of the cabinet 2, the extracting member 30 is moved, by means of the cam mechanism 40, in a longitudinal direction of the slider opening 22, that is the direction of insertion or ejection of the function-aid unit 10.

FIG. 7 shows the function-aid unit 10. The shape of the function-aid unit is like a flat plate. Formed at its edge is a connector 10A on the side of the card. In inserting the function-aid unit 10 in the enclosure section 11, the function-aid unit is inserted into the enclosure section 11 through the opening 14 in the case, where the edge of the card-side connector 10A is turned toward the inner part of the enclosure section 11, that is an edge at which the card-side connector 10A is not provided is on the outside of enclosure section 11. In ejecting the function-aid unit 10, the contact sections 30B of the extracting member 30 contact the edge of the card-side connector 10A so as to force the function-aid unit 10 to move in the direction of ejection.

Figure 8:
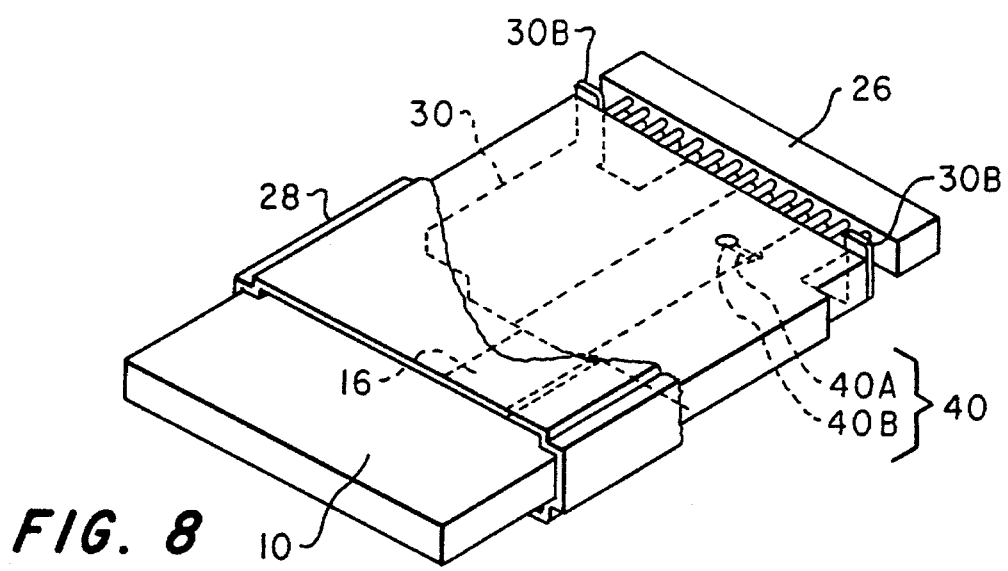
FIG. 8 is a perspective view showing the state that the function-aid unit of said embodiment is electrically connected to the connector on the side of the system within an enclosure section.

FIG. 8 shows a state where the function-aid unit 10 inserted in the enclosure section 11 is electrically connected to the system 1. In the figure, a connector 26, on the side of the system 1, is connected to the card-side connector 10A (FIG. 7). The function-aid unit 10 is supported through a guide member 28 so as to be able to move in the enclosure section 11. That is, as the function-aid unit 10 is inserted in the enclosure section 11, the function-aid unit 10 is guided by the guide member 28 and the card-side connector 10A reaches such a position as fitted in the connector 26. In the state that the card-side connector 10A is fitted in the connector 26, the contact sections 30B of the extracting member 30 contact the innermost edge of the function-aid unit 10. The state of the rotating body 18 and the slider button 16 in such a case is shown in FIG. 2.

FIG. 9 shows the state where the function-aid unit 10 is moved in the direction of ejection by the extracting member 30 in the enclosure section 11 and the card-side connector 10A is pulled out of the connector 26. When the slider button 16 is slid in the direction of ejection or the rotating member 18 is turned to the state shown in FIG. 3, the contact sections 30B of the extracting member 30 force the function-aid unit 10 to pull out of the connector 26. In the state that the function-aid unit 10 is pulled out of the connector 26, part of its front end appears from the opening 14 and is on the outside of the cabinet 2 (Refer to FIG. 3), An operator may therefore directly grasp the function-aid unit 10 and take it out from the enclosure section 11.

FIG. 10 shows a state where the system I is combined with an expansion unit 32. The expansion unit 32 is electrically connected to the system 1 through a bus connector 34. The expansion unit 32 has an internal power supply for the system 1 and has multiple units for enhancing functions of system 1 that effectively expands the number of available functions beyond the system 1 capacity. Both sides of system 1 are guided by guides 38. The expansion unit has a protrusion 36 for locking. The locking protrusion 36 prevents the system 1 from being removed unintentionally from the expansion unit 32. The locking protrusion 36 can be pressed down and the system 1 can be removed freely from the expansion unit 32 in the state that the locking protrusion 36 is pressed down. However, if the system 1 is locked in the state that the locking protrusion 36 protrudes as shown in FIG. 10, the system 1 cannot be removed from the expansion unit 32.

In the following, a method of using the preferred embodiment is described. If the function-aid unit 10 is to be installed in the system 1, the opening cover 8 is opened, and the function-aid unit 10 is inserted into the enclosure section 11 through the guide 28. When the end of the function-aid unit 10 contacts the connector 26, the function-aid unit 10 is pushed forward with greater force so that the card-side connector 10A provided at the end of the function-aid unit 10 is connected to the connector 26 located on the side of system 1.

If the function-aid unit is removed from the system 1, the opening cover 8 is opened, the system 1 is turned upside down so that the bottom surface 2B is placed upward, and the slider button 16 is slid in the direction of ejection of the function-aid unit 10 by operating it with a finger tip. However, as shown in FIG. 7 to FIG. 9, if a large number of pins are provided to the connectors 10A and 26, it may be very difficult to pull the function-aid unit 10 out of the connector 26 by operating the slider button 16 since a larger friction between the connectors 10A and 26 exists. Although it is very difficult to pull the function-aid unit out of the connector 26 by an operation of the slider button 16, the function-aid unit 10 can be easily pulled out of the connector 26 if the coin 20 is used to turn the rotating body 18 as shown in FIG. 3.

As shown in FIG. 10, when the system 1 is locked on the expansion unit 32, the slider button 16 and the rotating body 18 on the surface 2B of the cabinet 2 cannot be operated, which means that the function-aid unit 10 is locked in the system 1.

As described above, in the preferred embodiment, the extracting member 30, the slider button 16, and the rotating body 18 compose an apparatus for ejecting the function-aid unit 10. In addition, the slider button 16 and the extracting body 30 are combined with each other, as separate members so that they may be more easily formed. However, it will be recognized that they may have a single-piece structure. For the above reason, the embodiment has the advantages of a fewer number of parts, greater simplicity in construction, easy assembly, and the capability of down-sizing and being made thin.

Further, the embodiment has the advantage that the cabinet 2 is lifted up or turned upside down to perform an operation for ejecting the function-aid unit 10. Thus, it will be easily noticed if the function-aid unit 10 is pulled out of the system 1. The embodiment has therefore an effect of preventing the function-aid unit 10 from being carried away intentionally from the system 1 by a thief. To the contrary, in a conventional apparatus in which a function-aid unit can be taken out only by pressing an eject button that is provided close to an opening for ejection, the function-aid unit may be easily taken out and carried away without anxiety that those around are aware of such behavior. That is, such a conventional apparatus does not have an effect of preventing thievery of the function-aid unit 10. As shown in FIG. 10, if the system 1 is locked in the state that its bottom surface 2B is not exposed while locked in the expansion unit 32, the embodiment is highly effective in withstanding thievery.

In the first preferred embodiment, only one function-aid unit 10 is included in the enclosure section 11, but as shown in FIG. 11, it will be appreciated that two function-aid units 10 may be installed in the system 1, according to a second preferred embodiment. In FIG. 11, guides 128 guide two function-aid units 10. Two connectors 26 are provided in system 1 as well. The contact sections 30B can contact two function-aid units 10 simultaneously. This causes two function-aid units 10 to be pulled out of the connectors 26 together. In such an embodiment, a large force is required to extract two function-aid units 10 and it is very difficult to extract the function-aid units 10 only by an operation of the slider button 16. However, as shown in FIG. 3, if the rotating body 18 is turned with the coin 20, two function-aid units 10 can be easily extracted simultaneously.

Further, in the preferred embodiment, the slider button 16 and the rotating body 18 are provided on the bottom surface 2B of the cabinet 2, but it will be appreciated that they may be provided in a place other than the bottom surface 2B, for example, on the side wall 2A. However, providing them on the bottom surface 2B is effective in withstanding thievery. Further, it will be appreciated also that the slider button 16 and the rotating body 18 are not required to be provided together, only the rotating body 18 may be provided, or only the slider button 16 may be provided on the bottom surface 2B. The rotating body 18 has such a construction as can be turned with the coin 20, but it will be appreciated that the rotating body 18 itself may be formed so as to have a knob or manipulation section. However, the apparatus in which the coin 20 can be used has the advantage of simplicity in an apparatus.

Further, it will be appreciated that the present invention may be applied also to a case where more than two function-aid units are used. Still further, it will be appreciated also that the opposing apparatus is not limited to a laptop computer or an information processing system, and further, it does not have to be another electronic apparatus.

While the invention has been particularly shown and described with reference to a preferred embodiment, it will be understood by those skilled in the art that various changes in form and detail may be made therein without departing from the spirit and scope of the invention.

We claim:

1. An information processing system having:

a cabinet enclosing at least the main part of electronic circuits;

an opening provided on a side wall of said cabinet;

an enclosure section for enclosing a function-aid unit inserted into said cabinet from said opening;

a connector for electrically connecting to said function-aid unit within said enclosure section;

an extracting member for moving said function-aid unit toward said opening so as to extract said function-aid unit from said connector by engaging with said function-aid unit enclosed in said enclosure section; and a manipulation section provided on a bottom surface of said cabinet which acts on said extracting member, wherein the manipulation section includes a slider button supported on said bottom surface slidable from outside, and sliding the slider button in the direction of said opening moves said extracting member, and wherein the manipulation section includes a rotating body supported on said bottom surface rotatably from outside and such that a rotation of said rotating body is converted to a motion of said extracting member through a cam mechanism.

2. The information processing system according to claim 1, wherein said enclosure section is capable of enclosing a plurality of function-aid units, and said extracting member is constructed to have portions that make contact with said plurality of function-aid units so as to cause the plurality of function-aid units to be extracted from said connector by operating simultaneously on the plurality of function-aid units within the enclosure section.

3. An apparatus for ejecting a function-aid unit which can be connected or disconnected to or from a connector on the side of an opposing apparatus from said apparatus comprising:

an extracting member for moving said function-aid unit so that said function-aid unit can be pulled out of said connector;

a manipulation section provided on a bottom surface of said apparatus which acts on said extracting member to move said function-aid unit, wherein the manipulation section includes a slider button for causing said function-aid unit to be extracted from said connector by moving said extracting member when slid in a direction of extraction, and wherein the manipulation section includes a rotating body for causing said function-aid unit to be extracted from said connector by moving said extracting member when turned from said opposing apparatus.

4. An apparatus for ejecting a function-aid unit according to claim 3, the rotating body further being constructed so that a rotation of said rotating body is converted to a motion of said extracting member through a cam mechanism.

* * * * *

UNITED STATES PATENT AND TRADEMARK OFFICE
CERTIFICATE OF CORRECTION

PATENT NO. : 5,513,067
DATED : April 30, 1996
INVENTOR(S) : *Ishihara et al.*

It is certified that error appears in the above-indentified patent and that said Letters Patent is hereby corrected as shown below:

Column 4, line 20: change "l" to --1--

Column 6, line 42: delete "an opposing apparatus from"

Signed and Sealed this

Seventeenth Day of September, 1996

*Attest:*

BRUCE LEHMAN

*Attesting Officer*     *Commissioner of Patents and Trademarks*